United States Patent Office 2,974,122
Patented Mar. 7, 1961

2,974,122

MAKING HIGH LINEAR POLYESTER WITH MAGNESIUM HYPOPHOSPHITE CATALYST

James Lincoln, Brian James Hawthorne, and Ernest Jan Kowolik, Putteridge Bury, near Luton, England, assignors to British Celanese Limited, a company incorporated of Great Britain No Drawing. Filed May 7, 1957, Ser. No. 657,495

Claims priority, application Great Britain May 18, 1956

7 Claims. (Cl. 260—47)

This invention relates to the production of high linear polyesters, i.e. linear polyesters having an intrinsic viscosity substantially higher than 0.4, and especially above 0.5.

One method of making high linear polyesters consists in causing a dicarboxylic acid or an ester-forming derivative of a dicarboxylic acid to react with a glycol under conditions favouring polyesterification. For example a dialkyl ester of a dicarboxylic acid may be caused to react with a glycol under conditions such that an ester-interchange reaction first takes place, and is followed by polycondensation of the product (polyesterification); thus dimethyl terephthalate may be caused to react with ethylene glycol to give bis-(beta-hydroxyethyl) terephthalate, which is polycondensed to give polyethylene terephthalate.

In U.S. application S. No. 302,822, filed September 5, 1952, now matured to U.S. Patent 2,799,667 of July 16, 1957, there is described a better process, in which the dicarboxylic acid is caused to react with the cyclic carbonate of a glycol; thus polyethylene terephthalate is made by the reaction of terephthalic acid with ethylene glycol carbonate. An improvement in this process described in U.S. application S. No. 494,574, filed March 15, 1955, now matured to U.S. Patent 2,799,664 of July 16, 1957, consists in first forming a low linear polyester of intrinsic viscosity of 0.1–0.4, and then bringing dicarboxylic acid and glycol carbonate into contact with it under conditions favouring polyesterification; this process can with advantage be operated on a semicontinuous basis by working in stages.

In all these methods a catalyst is preferably employed so as to reduce the time necessary for the reaction. Many different catalysts have been used, among them sodium, potassium and lithium metals, magnesium ribbon, alkali metal salts of the reacting dicarboxylic acid, and various alcoholates. In the ester-interchange process referred to above it has also been proposed to employ two catalysts, one for the actual ester-interchange and one for the subsequent polyesterification.

It has now been found that by using magnesium hypophosphite as a catalyst for the production of high linear polyesters by the various methods referred to above, and especially by the methods of U.S. application S. No. 302,822 and U.S. application S. No. 494,574, in which a cyclic glycol carbonate is employed as one of the reactants, high linear polyesters of outstandingly good colour can be obtained.

According to this invention therefore high linear polyesters are made by a process which comprises the step of heating a lower linear polyester of intrinsic viscosity at most 0.4 in the presence of magnesium hypophosphite as catalyst to a temperature at which it undergoes further polymerisation. This lower linear polyester may be made by any of the methods referred to above, but as already stated we prefer to use the method of U.S. application S. No. 302,822, or, best of all, that of U.S. application S. No. 494,574. It will of course be understood that the whole process of forming the high linear polyester from the monomeric starting materials can if desired be carried out as a single operation, even though it will usually be found preferable to divide it up into two or more stages in which the operating conditions differ to some degree.

It has further been found that when the magnesium hypophosphite is employed in association with stannous phosphide (SnP), polyesters of excellent colour and high intrinsic viscosity can be obtained in a shorter time. Preferably the proportion of magnesium hypophosphite used (reckoned as the hexahydrated salt) is at least twice and especially 2.5–5 times that of the stannous phosphide.

Whatever the precise method of working employed, part or all of the magnesium hypophosphite, and also of the stannous phosphide if this is to be used in addition, may be present throughout the whole reaction, being contained in the initial mixture of monomeric substances or of monomeric substances and low polyester; alternatively the magnesium hypophosphite, with or without stannous phosphide, may be added only at a later stage during the reaction, in which case some other catalyst is preferably employed from the beginning. Thus when the ester-interchange method, or a method in which a glycol carbonate reacts with a free dicarboxylic acid, is used, the first stage may be carried out with the aid of a known ester-interchange catalyst, e.g. magnesium metal, after which the magnesium hypophosphite, and if desired also stannous phosphide, is added so as to catalyse the polyesterification. For example magnesium hypophosphite may be added at some time after the reaction mixture has become homogeneous in appearance, and especially after it has reached an intrinsic viscosity of 0.1.

The invention is of particular importance in connection with methods of carrying out the processes of U.S. application S. No. 302,822 and U.S. application S. No. 494,574, in which two or more separate stages are employed, the product of the first of which is a low polyester having an intrinsic viscosity of 0.1–0.4, and preferably 0.15–0.3. One such method is described in detail in U.S. application S. No. 494,574, and consists in first forming a low polyester of the desired intrinsic viscosity (in this case by the reaction of the dicarboxylic acid and cyclic glycol carbonate in the presence of preformed low polyester, preferably in a continuous manner), and then heating this low polyester further under polyesterification conditions; this further heating is preferably divided into two stages, in the first of which atmospheric pressure is employed, and in the second a high or fairly high degree of vacuum, especially a pressure below 5 mm. of mercury. When the invention is applied to such methods of working the magnesium hypophosphite, and optionally stannous phosphide, catalyst may be added to low polyester produced in the course of the first stage, either at the end of the stage or at some point during the first stage at which the reaction mixture has a homogeneous appearance and preferably an intrinsic viscosity of at least 0.1.

The magnesium hypophosphite, and the stannous phosphide when this is used, may be added to the reaction mixture or the low polyester as powdered solid or as a dispersion in a suitable organic liquid, for example a glycol or a mixture of a glycol with water, or a mixture of a cyclic glycol carbonate with water. For example, when the polyester is made by a multi-stage process as described above, the low polyester first obtained may be allowed to become solid and may then be powdered, and the catalyst intimately mixed with the powdered polyester in any suitable way, either as a solid or dispersed in a liquid. Alternatively the catalyst may be added to the molten low polyester. If it is desired to add a delustrant such as titanium dioxide or another pigment or any similar effect material to the reaction mixture, it may conveniently be added with the catalyst, e.g. dispersed in the same organic liquid. However if desired the catalyst and effect material may be added separately, either at the same or at different points in the process.

Quite small proportions of the magnesium hypophosphite are needed, and it is preferable to employ only so much catalyst as will cause the polymerisation to proceed at the desired rate. Generally speaking the amount of magnesium hypophosphite, reckoned as magnesium, should be below 0.05% and preferably below 0.03%, e.g. between about 0.002 and 0.02%, of the weight of the high linear polyester theoretically obtainable from the amount of dicarboxylic acid or dicarboxylic acid diester employed, and as already stated stannous phosphide, if used at all, is preferably present in amount between about 0.2 and 0.4 times the weight of the magnesium hypophosphite. Generally speaking proportions of catalyst towards the lower end of the range give the best colour, though the intrinsic viscosity attained in a given time, and indeed the maximum intrinsic viscosity conveniently attainable, are at their highest when higher proportions are used.

The conditions employed for the polyesterification, apart from the presence of the magnesium hypophosphite catalyst, may be those described in U.S. application S. No. 302,822 or U.S. application S. No. 494,574. Usually temperatures of about 250°–300° C. are suitable, in combination with operating pressures which may be atmospheric for the first part of the polyesterification, but are preferably quite low, especially below 5 mm. of mercury, at least for the last part. To produce a polyester of the best colour it is essential rigorously to exclude oxygen from the reaction zone.

The invention is illustrated by the following Examples. The parts given are all by weight.

*Example I*

249 parts of terephthalic acid containing 0.15 parts of sodium terephthalate, 0.27 parts of cleaned magnesium ribbon and 140 parts of ethylene carbonate were heated together in an atmosphere free from oxygen and water vapour to a temperature of 270°–280° C. for 4½ hours, the mixture being stirred as soon as it became sufficiently fluid. At the end of this time 290 parts of a low polyethylene terephthalate of intrinsic viscosity in the neighbourhood of 0.2 had been formed.

The magnesium ribbon was now removed, and 0.25% of magnesium hypophosphite (used and reckoned as the hexahydrated salt) was added as a dispersion in aqueous ethylene glycol, after which heating, again in the absence of oxygen, was continued for 3 hours, first under atmospheric pressure and then under a pressure of 3–5 mm. of mercury at 275° C. There was obtained a polyethylene terephthalate of intrinsic viscosity 0.56 and quite excellent colour. By heating for a further 2 hours under the same low pressure the intrinsic viscosity could be raised still further, and a very useful fibre-forming polymer obtained, without substantially affecting the colour.

*Example II*

The process of Example I was repeated, except that instead of the 0.25 part of magnesium hypophosphite there was added 0.2 part of magnesium hypophosphite and 0.06 part of stannous phosphide which had been purified by heating it to 270° C. under a very low pressure for 3–4 hours, so as to remove any uncombined phosphorus. The product was of outstandingly good colour and had an intrinsic viscosity of 0.70.

*Example III*

500 parts of dimethyl terephthalate, 400 parts of ethylene glycol, 1.4 parts of finely powdered magnesium hypophosphite and 0.6 part of finely powdered stannous phosphide were heated together in an atmosphere of dry nitrogen under atmospheric pressure for 2 hours at 180°–200° C. and then for a further 2 hours at 220° C. The pressure was then reduced to 2.5 mm. and the temperature of the reaction mixture was raised to 270° C. for a further 3 hours. The resulting polymer was fibre-forming and had a melting point of 250°–254° C. and an excellent colour.

While the figures for the intrinsic viscosity given in the remainder of the specification and the claims are as determined on a solution of 1 gram of the polyester in 100 cc. of m-cresol, as described in U.S. application S. No. 302,822 and U.S. application S. No. 494,574, those given in Examples 1–3 above were obtained using as solvent a mixture of 3 parts by weight of phenol to 1 part by weight of tetrachloroethane, the other conditions remaining the same. The figures so obtained are greater than those obtained using m-cresol as the solvent by a factor in the neighbourhood of 1.3. The proportions of magnesium hypophosphite and stannous phosphide are expressed as percentages of the yield of polyethylene terephthalate theoretically obtainable from the terephthalic acid or its methyl ester employed.

While the invention has been described with particular reference to the production of polyethylene terephthalate, it is applicable also to the manufacture of high linear polyesters (including polyether esters as described in U.S. application S. No. 374,825, filed August 17, 1953, now matured to U.S. Patent 2,799,665 of July 16, 1957) derived from other glycols, and/or from other dicarboxylic acids, especially aromatic dicarboxylic acids with their carboxyl groups linked to the aromatic nucleus or nuclei in diametrically opposite positions, but including also aliphatic dicarboxylic acids such for example as adipic acid. Examples of such other dicarboxylic acids and glycols are given in U.S. application S. No. 302,822 and U.S. application S. No. 374,825, and include certain substituted terephthalic acids, diphenyl-4.4'-dicarboxylic acid, $\alpha.\beta$-diphenylethane-4.4'-dicarboxylic acid, $\alpha.\delta$-diphenylbutane-4.4'-dicarboxylic acid and other $\alpha.\omega$-diphenylalkane-4.4'-dicarboxylic acids, $\alpha.\beta$-diphenoxyethane-4.4'-dicarboxylic acid, $\alpha.\delta$-diphenoxybutane-4.4'-dicarboxylic acid and other $\alpha.\omega$-diphenoxyalkane-4.4'-dicarboxylic acids, and the 1.5-, 2.6- and 2.7-naphthalenedicarboxylic acids; and trimethylene, propylene, 1.2-butylene and 2.3-butylene glycols.

Having described our invention, what we desire to secure by Letters Patent is:

1. A process for the manufacture of a high linear polyester from a lower linear polyester of a lower alkylene glycol and an aromatic dicarboxylic acid selected from the group consisting of terephthalic acid, diphenyl-4.4'-dicarboxylic acid, $\alpha,\beta$-diphenylethane-4.4'-dicarboxylic acid, $\alpha,\delta$-diphenylbutane-4.4'-dicarboxylic acid, $\alpha,\beta$-diphenoxyethane - 4.4' - dicarboxylic acid, $\alpha,\delta$-diphenoxybutane - 4.4' - dicarboxylic acid, 1.5-naphthalene-dicarboxylic acid, 2.6-naphthalene-dicarboxylic acid, and 2.7-naphthalene-dicarboxylic acid, said lower polyester having an intrinsic viscosity of 0.1 to 0.4, which comprises heating the said lower polyester at a temperature of 250°–300° C. in the presence of magnesium hypophosphite as catalyst, the amount of magnesium hypophosphite, reckoned as magnesium, being less than 0.05 percent of the weight of high linear polyester theoretically obtainable, and continuing the heating until the intrinsic viscosity of the polyester is increased to at least 0.5.

2. A process for the manufacture of a high linear polyethylene terephthalate which comprises heating a polyethylene terephthalate having an intrinsic viscosity of 0.1 to 0.4 to a temperature of 250°–300° C. in the presence of magnesium hypophosphite as catalyst in an amount corresponding with from 0.002 to 0.05 percent by weight of magnesium based on the weight of the polyethylene terephthalate and continuing the heating until the intrinsic viscosity of the polyethylene terephthalate is at least 0.5.

3. A process according to claim 2 wherein the polyethylene terephthalate of intrinsic viscosity of 0.1 to 0.4 is made by heating together terephthalic acid and ethylene carbonate.

4. A process according to claim 2 wherein the polyethylene terephthalate of intrinsic viscosity of 0.1 to 0.4 is made by heating together a dialkyl ester of terephthalic acid and ethylene glycol.

5. A process according to claim 2 wherein said lower polyesters are formed by heating an initial mixture selected from the group consisting of (a) a mixture of terephthalic acid and ethylene carbonate and (b) a mixture of a diester of terephthalic acid and ethylene glycol, and at least part of the magnesium hypophosphite used is present in said initial mixture.

6. A process according to claim 5 wherein a mixture of magnesium hypophosphite and stannous phosphide as ester interchange catalyst is added to the initial reaction mixture and the ratio of magnesium hypophosphite, reckoned as the hexahydrated salt, to stannous phosphide is between 2.5:1 and 5:1 by weight.

7. A process according to claim 2 wherein the amount of magnesium hypophosphite is used, reckoned as magnesium, is between 0.002 to 0.03 percent of the weight of the polyethylene terephthalate.

References Cited in the file of this patent

UNITED STATES PATENTS

| | | |
|---|---|---|
| 2,249,950 | Fuller | July 22, 1941 |
| 2,465,319 | Whinfield | Mar. 22, 1949 |

FOREIGN PATENTS

| | | |
|---|---|---|
| 588,833 | Great Britain | June 4, 1947 |